(12) United States Patent
Henrikson

(10) Patent No.: US 7,570,369 B2
(45) Date of Patent: Aug. 4, 2009

(54) METHOD AND A DEVICE FOR MEASUREMENT OF EDGES

(75) Inventor: Per Henrikson, Trollhättan (SE)

(73) Assignee: Volvo Aero Corporation, Trollhättan (SE)

( * ) Notice: Subject to any disclaimer, the term of this patent is extended or adjusted under 35 U.S.C. 154(b) by 119 days.

(21) Appl. No.: 11/913,705

(22) PCT Filed: Jun. 17, 2005

(86) PCT No.: PCT/SE2005/000970

§ 371 (c)(1),
(2), (4) Date: Nov. 6, 2007

(87) PCT Pub. No.: WO2006/013529

PCT Pub. Date: Dec. 21, 2006

(65) Prior Publication Data

US 2008/0186515 A1    Aug. 7, 2008

(51) Int. Cl.
*G01B 11/24* (2006.01)
(52) U.S. Cl. ............... 356/601; 356/634; 356/237.2; 250/559.36
(58) Field of Classification Search ... 356/237.1–237.5, 356/601–623, 634; 250/559.22, 559.36, 250/559.19, 559.26
See application file for complete search history.

(56) References Cited

U.S. PATENT DOCUMENTS

| | | | |
|---|---|---|---|
| 5,679,161 A * | 10/1997 | Wysokowski et al. | ....... 118/669 |
| 6,580,813 B1 | 6/2003 | Hermans et al. | |
| 7,161,667 B2 * | 1/2007 | Meeks et al. | ............. 356/237.2 |
| 7,266,420 B2 * | 9/2007 | Budd | ........................ 700/175 |
| 2002/0154298 A1 * | 10/2002 | Hagen et al. | ............. 356/239.1 |
| 2002/0163573 A1 | 11/2002 | Bieman et al. | |
| 2005/0023491 A1 * | 2/2005 | Young et al. | ........... 250/559.42 |
| 2008/0030731 A1 * | 2/2008 | Jin et al. | ..................... 356/369 |
| 2009/0086196 A1 * | 4/2009 | Sakaguchi | ............... 356/237.2 |
| 2009/0091748 A1 * | 4/2009 | Nohara et al. | ............. 356/237.2 |
| 2009/0097018 A1 * | 4/2009 | Watanabe | ................. 356/237.2 |
| 2009/0116727 A1 * | 5/2009 | Jin et al. | ..................... 382/149 |

FOREIGN PATENT DOCUMENTS

JP    4297810 A    10/1992
JP    2001264032    9/2001

OTHER PUBLICATIONS

International Search Report for corresponding International Application PCT/SE2005/000970.
International Preliminary Report on Patentability for corresponding International Application PCT/SE2005/000970.

* cited by examiner

*Primary Examiner*—Hoa Q Pham
(74) *Attorney, Agent, or Firm*—WRB-IP LLP

(57) ABSTRACT

In a method for measuring the size or shape of an edge of a machined work piece or of a cutting edge of a tool, the surface of the edge is illuminated by diffused radiation from several positions in the vicinity to the edge by an illumination arrangement, and a picture of the edge is reproduced by recording reflected radiation from the illuminated edge by means of a picture reproduction unit.

36 Claims, 3 Drawing Sheets

METHOD AND A DEVICE FOR MEASUREMENT OF EDGES

BACKGROUND AND SUMMARY

The present invention relates to a method and a device for measurement of edges.

The invention is applicable to different types of edge, for example edges on a machined metal work piece which edges constitute a part of the circumference of the work piece or surround boreholes or other apertures in the work piece. Particularly, an aspect of the invention can be used for inspection of the projected length or area of a broken edge, i.e. for determining the so called break-edge value.

An aspect of the invention can also be applied for similar measurement of cutting edges of tools having for example hard metal inserts for machining work pieces, which cutting edges are subjected to wear such as flank wear, notch wear, etc. during machining, for example, during a turning or milling operation.

In the manufacturing industry where metal work pieces are subjected to different machining operations, such as reaming, drilling and milling, burrs are removed and very sharp edges are broken, for example, rounded, in a subsequent burring operation so as to obtain a desired shape of the edges. The burring operation may in turn comprise different steps, such as filing, buffing and tumbling. In the absence of such a subsequent treatment of the work piece in question, the sharp edges could cause cracks and damage of the work piece when being used as a structural member. Therefore, there are often tolerance requirements on the product which are based on stipulated maximum and minimum values for the edge break.

Furthermore, the performance of a cutting edge of an insert is very much dependent on the degree of wear. The type and degree of wear influence the characteristics, such as dimension, surface finish etc., of the final work piece machined by means of the insert. Hence it is desirable to continuously measure the wear of a cutting edge so as to ensure the cutting operation will give the desired result. Knowledge about the wear of a cutting edge can be used to calculate compensation displacement of a tool or to make a decision that an insert has to be indexed or replaced. There is also a demand for determining the size or shape of such cutting edges on inserts when the inserts are manufactured, before the use of the inserts in machining operations, so as to ensure the inserts have the requisite quality.

In accordance with prior art some kind of profile projector or microscope is often used for investigation of edges on work pieces in order to evaluate the result of a burring operation. Since, for practical reasons, it is difficult to apply these techniques on large work pieces which are not possible to be moved to a measurement station, a soft piece of aluminum can be used to create a reproduction of the edge and the adjacent area. By beating a soft aluminum piece against the edge to be measured, a reproduction sample is obtained. The aluminum piece is then removed and used for analysis purposes. The aluminum piece is easier to handle and can be put under a profile projector or a microscope for studying the profile and radii of the edge. However, in addition to be a very time-consuming method, due to the measurement on a reproduction sample which has an inverted shape in comparison to the real edge, the accuracy of the measurement of the length and shape of a broken edge when using this method is very often unsatisfying.

This in turn means that very few measurements of broken edges are performed. Besides the use of visual inspection to find any visually detectable defects or indications, usually, aluminum samples are only used as spot tests for checking the radius and/or the profile of the edge. In the manufacture of a certain component, very often measurements are performed only once or a few times when machining is started to ensure the size and the angle of the edge break are correct, and then the process is presumed to be stable during the remaining similar machining moments.

It is desirable to provide a method and a device of the type mentioned by way of introduction, which method and device enable automatically measurement of edges of work pieces or tools, particularly in situ measurements.

By a method/device according to an aspect of the present invention, the work piece can be measured without moving the work piece to a measurement station or using a reproduction sample of aluminum. Thanks to the provision of diffused radiation from several positions in the vicinity of the edge, it is ensured that a sufficient number of positions on the edge are subjected to radiation having such incident angles so that the radiation is reflected from the edge directly to the picture reproduction unit. Due to the geometrical shape of a component having an edge, it is possible to arrange the illumination means and the picture reproduction unit so as to illuminate the component in such a way that the edge surface is accentuated, whereas the adjoining surfaces which form the edge are suppressed in the produced picture of the edge. In other words; the radiation which reaches the surfaces surrounding the edge is mostly reflected in directions not receivable by the picture reproduction unit. The brighter the edge surface the more reflection where the incident angle is equal to the reflection angle is obtained. Thus, a sharp picture of the edge can be obtained, and this picture may be real-time digitalized for automatically evaluation. A picture of the edge can preferably be produced for measuring the projected length of the edge.

Although bright surfaces surrounding the edge are advantageous because such surfaces further accentuate the edge in the picture, an aspect of the invention can also be applied for evaluation of an edge which is surrounded by surfaces which are matt in comparison to the edge.

According to a preferred embodiment of an aspect of the invention, a diffusor plate is used to create a great number of individual radiation sources on the diffusor plate for illuminating an edge, each of which radiation sources radiates substantially in all directions in space which directions are defined by a semi-sphere for instance. Hereby, independent of the edge break angle, the edge may be illuminated by means of several radiation sources each emitting radiation which has various incident angles when reaching the edge. This ensures that there are always radiation beams which are reflected by the edge in directions directly towards the picture reproduction unit. The picture created by the picture reproduction unit is preferably based on direct reflection from the edge surface.

According to a further preferred embodiment of an aspect of the invention, a telecentric lens is used to enable 3-dimensional measurement with high accuracy. The use of a telecentric lens means that a substantially constant magnification in depth is obtained over a certain interval, i.e. the telecentric range. This in turn simplifies calibration of picture geometry and reproduction conditions, since the calibration has to be performed only once, as long as the dimension changes of the edge due to burring (or wear) not exceed the telecentric range, Other advantageous features and functions of different embodiments of aspects of the invention appear from the following detailed description.

BRIEF DESCRIPTION OF THE DRAWINGS

With reference to the appended drawings, below follows a more detailed description of preferred embodiments of the invention provided merely as non-limiting examples.

In the drawings.

DETAILED DESCRIPTION

Figure 1:
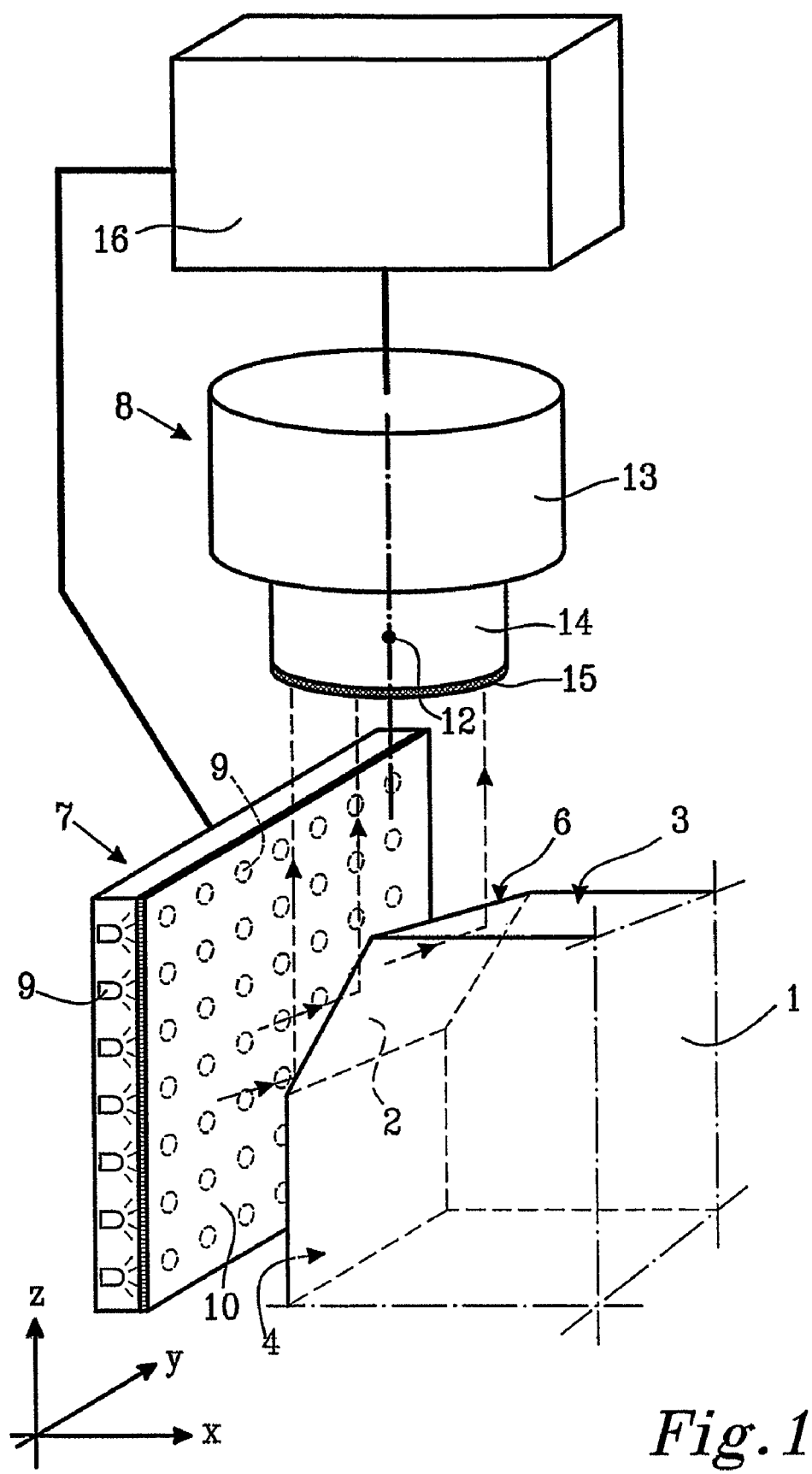
FIG. 1 is a schematic perspective view of a device according to an aspect of the invention applied on a component having an edge break constituted by one flat surface.
Figure 2:
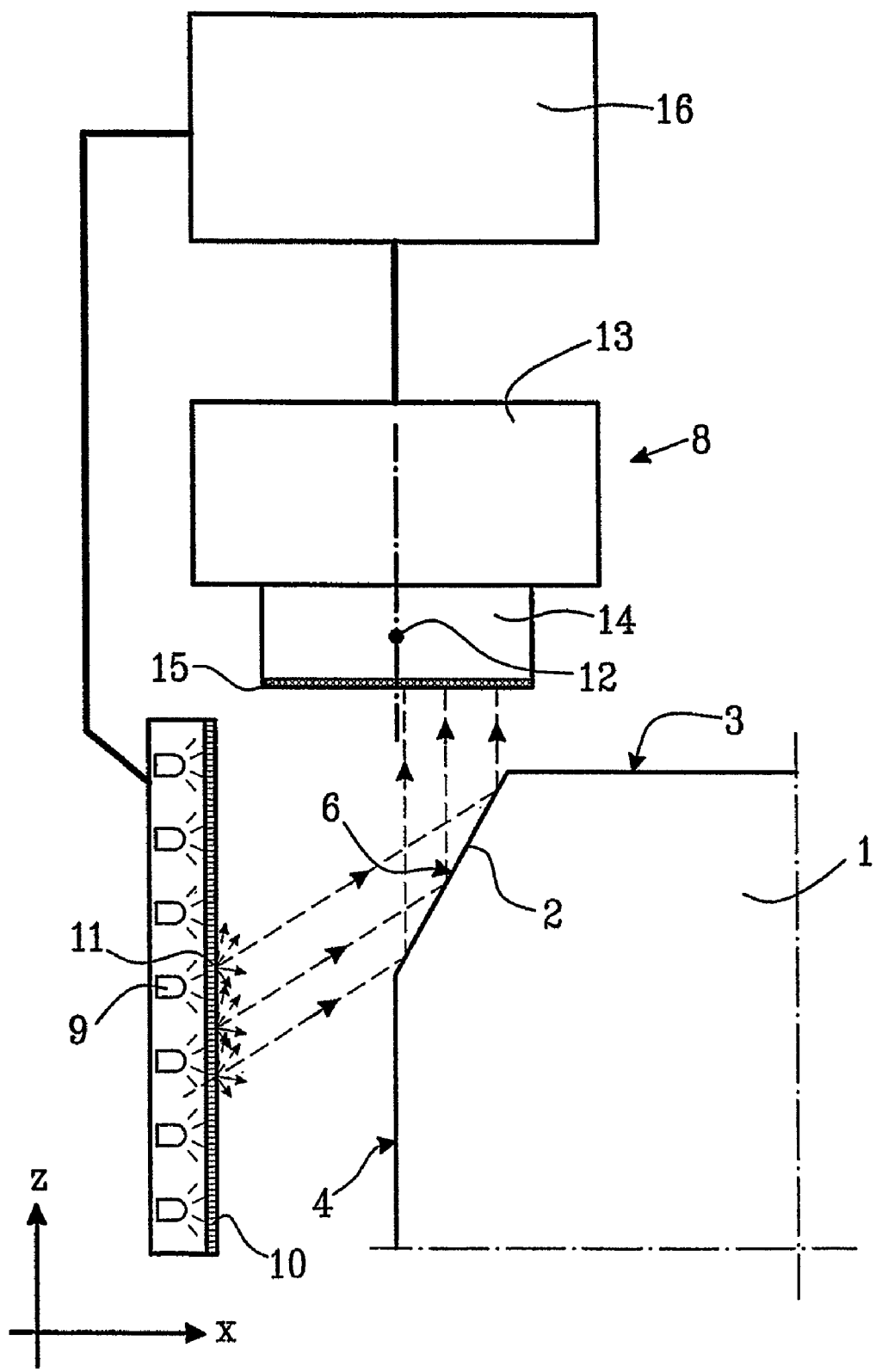
FIG. 2 is a schematic lateral view of the device and the component in FIG. 1.
Figure 3:
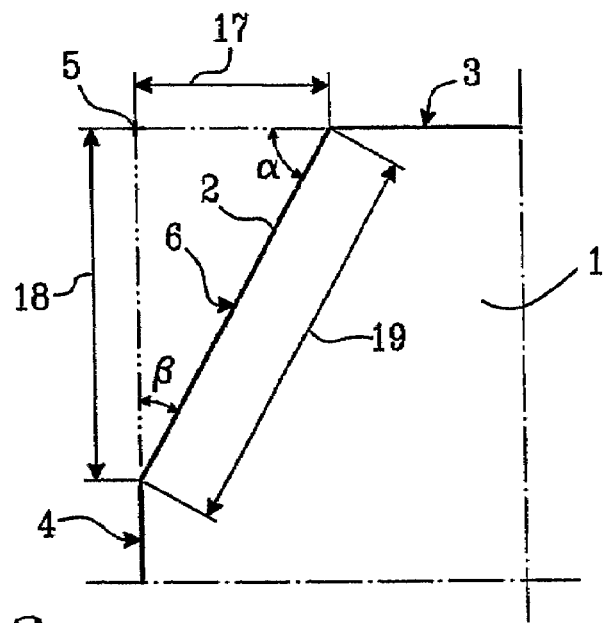
FIG. 3 is an enlarged view of the edge of the component in FIG. 2.

In FIGS. 1, 2 and 3, a component 1 to be depicted and measured is illustrated. The component 1 has a broken edge 2, and has further a first upper surface 3 and a second lateral surface 4. The component 1 can be a machined work piece or a cutting edge of a tool, for which the size or shape of the edge 2 is critical to the performance of the component or the tool.

In this example, the first and second surfaces 3, 4 are situated substantially perpendicular relative to each other. The edge 2 formed relatively close to the line (which line appears as a point 5 in FIG. 3) where the first and second surfaces theoretically intersect each other, is broken, thereby forming a third surface 6 of the component 1. The third surface 6 is flat and forms a first angle α, and a second angle β relative to the first and second surfaces, respectively, as appears from FIG. 3. This edge 2 having such a flat surface 6 is only one example of an edge possible to be depicted by means of the method and device according to an aspect of the invention. Although measurement of edges on components of different shapes may be performed, the method is particularly advantageous when it is applied on edges formed by two adjoining surfaces 3, 4 which are substantially perpendicular relative to each other.

An illumination means 7 is arranged to illuminate the third surface 6, i.e. the edge 2, of the component by diffused radiation from several positions 9 in the vicinity to the edge 2. A unit 8 for reproducing a picture of the edge 2 by recording reflected radiation from the illuminated edge 2 is also arranged close to the component 1.

The illumination means 7 may comprise a matrix of several substantially point-shaped light sources 9 so as to obtain the diffused radiation. The point-shaped light sources are preferably constituted by light emitting diodes (LEDs). The number of light source positions or LEDs 9 is preferably more than 5, more preferably more than 10, and often the number of LEDs or corresponding light sources 9 is in the magnitude of 50-150. In the example illustrated in FIGS. 1 and 2, the number of LEDs is approximately 50. If the area of the surface of the illumination means 7 facing the component 1 is of the size 30 cm², the number of LEDs may preferably be about 100. In general, a larger surface 6 of the edge 2 demands a greater number of light sources 9.

In order to obtain an even more diffused radiation, a diffusor plate 10 may be arranged between the point-shaped light sources 9 and the component 1. Such a diffusor plate 10 creates a great number of small individual radiation sources 11 when being illuminated. Each of these individual radiation sources 11 illuminates the component 1 by radiation in many different directions resulting in different incident angles on the third surface 6. By illumination of the edge 2 with radiation having different incident angles, it is ensured that there is always radiation which has an angle of reflection suitable to receive the picture reproduction unit 8.

In the example illustrated in FIGS. 1 and 2, the point-shaped light sources 9 are arranged in a two-dimensional array which is parallel with a geometrical plane formed by a Y-axis and a Z-axis of a coordinate system having X, Y and Z-axes. The diffusor plate 10 is also arranged parallel with this plane. An optical axis 12 of the picture reproduction unit 8 is arranged parallel with the Z-axis. This means the matrix of the point-shaped light sources 9 and the optical axis 12 of the picture reproduction unit are arranged substantially parallel relative to each other. Furthermore, the matrix of the point-shaped light sources 9 is preferably arranged substantially in parallel with the second surface 4 of the component 1, and the optical axis 12 of the picture reproduction unit 8 is preferably arranged substantially perpendicularly to the first surface 3 of the component 1.

The picture reproduction unit 8 may comprise a monochromic CCD camera 13, preferably arranged in the Z-direction as described above, which camera 13 is turned against the component 1 to receive radiation reflected from the third surface 6. This means the optical axis 12 of the camera 13 is arranged parallel with the Z-direction and the camera "looks on" the edge 2 to be measured. Furthermore, the picture reproduction unit 8 preferably comprises a telecentric lens 14 arranged between the component 1 and the camera 13. A telecentric lens 14 makes it possible to obtain a substantially constant magnification throughout the picture even though different positions of the object to be reproduced are situated at different distances relative to the picture reproduction unit 8.

Of course it is possible to change the positions of the picture reproduction unit 8 and the illumination means 7 so as to illuminate the component, i.e. the third surface 6, in a direction substantially perpendicular to the first upper surface 3 instead of the second lateral surface 4. This means the picture reproduction unit 8 "looks on" the third surface 6 in a direction substantially perpendicular to the second lateral surface 4, and, thus the edge is depicted as looked on from another position in the horizontal direction.

With the purpose of minimizing the disturbance from radiation in the environment, the illumination means can be designed to emit radiation in a specific wave length interval. In order to match the radiation from the illumination means 7, the reproduction unit 8 is suitably provided with a filter 15 for filtering around a wave length comprised in the radiation emitted by the illumination means 7. Such a band-pass filter can be used for discriminating radiation having a wave length which does not fall within a certain wave length interval. For example, if light emitting diodes which mainly radiate in a wave length interval close to 640 nm are used, radiation having a wave length <550 nm, preferably <600 nm, can be cut off by the band-pass filter and, thus disturbance from such radiation occurring in the environment can be avoided. However, radiation having other wave lengths in the visible range, such as radiation from light emitting diodes having a wave length close to 880 nm, is also possible to be used for illumination of the component. Then, the lower limit of the band-pass filter interval is suitable approximately 760 nm or preferably 840 nm. Of course the band-pass filter is suitably adapted in accordance with the radiation created by the illumination means.

An aspect of the invention may be applied for measurement of the edge break, such as projected length or projected area (=projected length multiplied with a longitudinal length of the edge) of a broken edge and/or a radius of the edge. Of course other characteristics of an edge associated with the shape of the edge can also be measured or analyzed. However, an aspect of the invention is particularly useful for automatic measurements of a projected length of an edge.

A computer unit 16 may be connected to the picture reproduction unit 8 for storing and/or displaying and/or automatically analyzing the reproduced picture of the edge. The computer unit 16 could also be connected to the illumination means 7 for controlling the illumination means 7 so as to adapt the illumination to the present circumstances. A display (not illustrated) may be used for displaying the picture of the edge measured and/or the results of the evaluation of the picture. Digitalization and evaluation of the picture may be performed in real time by means of the computer unit 16. Such a real-time evaluation is very useful in many applications. In other cases the reproduction of pictures is performed in situ, whereas the evaluation of the reproduced pictures could be performed afterwards.

In FIG. 3 an enlarged view of the edge 2 of the component in FIG. 2 is shown. In addition to the measurement of a projected length 17, additionally measurements and calculations can be performed so as to determine for example a real length 19 of the edge. As illustrated in FIG. 3, the projected length 17 can be measured from two different positions, a first position where the reproduction unit is directed so as to determine a first projected length 17, and a second position where the reproduction unit is turned substantially 90° relative to the first position, so as to determine a second projected length 18. Then, by using the measured projected lengths 17, 18 and conventional mathematics, the real length 19 and the slope angles $\alpha$, $\beta$ of the edge 2 can be calculated. However, in a case where the slope angles are known to be approximately $\alpha=\beta=45°$ which is frequently occurring, the real length can be calculated based on determination of one projected length only.

Figure 4:
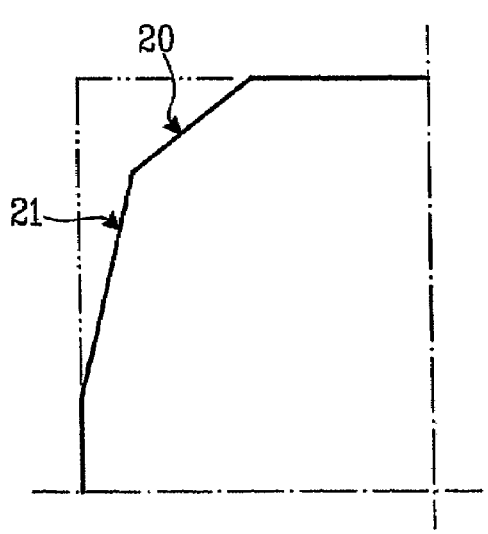
FIG. 4 is a schematic view of a component having an edge break constituted by two differently inclined flat surfaces.
Figure 5:
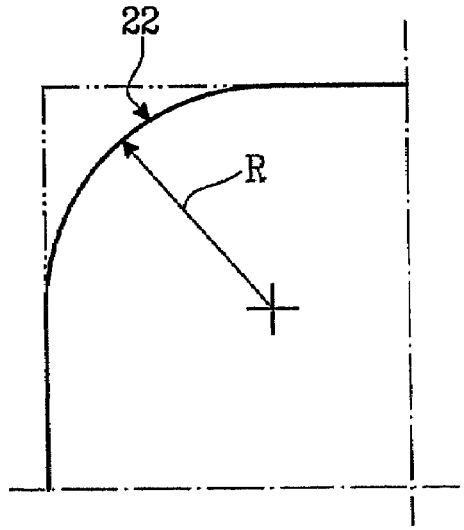
FIG. 5 is a schematic view of a component having an edge break constituted by a convex partial sphere-shaped surface defined by a certain radius.

When using the method or the device according to an aspect of the invention measurements can be performed on several different types of edge. In FIGS. 4 and 5 an edge break constituted by two differently inclined flat surfaces 20, 21 and constituted by a convex partial sphere-shaped surface 22 defined by a certain radius R, respectively, are illustrated. These edges are illustrated merely as examples, and the edge shape could be more complicated. In general, the projected edge length or radius is typically in the interval 0.01-2 mm, and preferably in the interval 0.1-1 mm. In FIG. 5 the projected length corresponds to the radius R of the edge. However, independent of the shape or real length of the edge, the projected length can always be determined and used as a measure of the condition of the edge.

It should be pointed out that when using the terms "projected length" and "real length" herein, these words represents measures in a cross section of the component taken perpendicular to the longitudinal extension of the edge. In FIGS. 2 and 3, the longitudinal extension of the edge is parallel with a direction perpendicular to the paper.

Of course, if the illumination unit and/or the picture reproduction unit has not the sufficient extension in the Y-axes direction to cover the whole portion of the edge to be depicted, the picture illumination unit and/or the reproduction unit can be moved along the Y-axes for evaluation of different portions of the edge along the longitudinal extension of the edge. If the longitudinal extension of the edge is not a straight line, the illumination unit and/or may be moved along the longitudinal extension of the edge while following the curvature of the edge.

It is to be understood that the present invention is not limited to the embodiments described above and illustrated in the drawings; rather, the skilled person will recognize that many changes and modifications may be made within the scope of the appended claims.

The invention claimed is:

1. A method for measuring the size or shape of an edge of an article, comprising illuminating a surface of the edge by diffused radiation from plurality of positions proximate the edge by an illumination arrangement, and reproducing a picture of the surface of the edge by recording reflected radiation from the illuminated edge by a picture reproduction unit, which radiation is reflected from the edge directly to the picture reproducing unit, thereby enabling a projected length of the edge to be measured in the reproduced picture.

2. A method according to claim 1, comprising using the illumination arrangement having a matrix of a plurality of substantially point-shaped light sources.

3. A method according to claim 2, comprising using the illumination arrangement wherein the point-shaped light sources comprise light emitting diodes.

4. A method according to claim 2 comprising arranging the point-shaped light sources in a two-dimensional array.

5. A method according to claim 4, comprising arranging the point-shaped light sources in a geometrical plane which is substantially parallel to an optical axis of the picture reproduction unit.

6. A method according to claim 4, comprising arranging the point-shaped light sources in a geometrical plane which is substantially parallel to one of two adjoining surfaces which form the edge.

7. A method according to claim 1, comprising arranging an optical axis of the picture reproduction unit substantially perpendicularly relative to one of two adjoining surfaces which form the edge.

8. A method according to claim 1, comprising using the oriented substantially perpendicular relative to each other.

9. A method according to claim 1, comprising using the illumination arrangement having an optical diffusor plate arranged to create a plurality of individual radiation sources when being illuminated.

10. A method according to claim 1, comprising using the picture reproduction unit having a telecentric lens.

11. A method according to claim 1, comprising using the picture reproduction unit having a band-pass filter, the band-pass filter filtering around a wave length comprised In the radiation emitted by the Illumination arrangement.

12. A method according to claim 11, comprising using the band-pass filter filtering around the wave length 640 nm.

13. A method according to claim 11, comprising using the band-pass filter filtering around the wave length 880 nm.

14. A method according to claim 11, comprising using the band-pass filter cutting off the radiation having a wave length <560 nm.

15. A method according to claim 11, comprising using the band-pass filter cutting off the radiation having a wave length <600 nm.

16. A method according to claim 11, comprising using the band-pass filter cutting off the radiation having a wave length <760 nm.

17. A method according to claim 11, comprising using the band-pass filter cutting off the radiation having a wave length <840 nm.

18. A method according to claim 1, comprising measuring a projected length of the edge.

19. A method according to claim 1, comprising measuring a radius of the edge.

20. A method according to claim 1, comprising using the picture reproduction unit which comprises a CCD camera (13).

21. A method according to claim 1, comprising using a computer unit connected to the picture reproduction unit for automatically analysing the reproduced picture of the edge.

22. A device for measuring the size or shape of a broken edge of a machined work piece or of a cutting edge of a tool, wherein the device has arrangement for illuminating a surface of the edge with diffused radiation from a plurality of positions in the vicinity to the edge, and a unit for reproducing a picture of the surface of the edge by recording reflected radiation from the illuminated edge, which radiation is reflected from the edge directly to the picture reproducing unit, so as to enable a projected length of the edge to be measured in the reproduced picture.

23. A device according to claim 22, wherein the illumination arrangement comprises a matrix of a plurality of substantially point-shaped light sources for illumination of the edge surface.

24. A device according to claim 23, wherein the substantially point-shaped light sources are constituted by light emitting diodes.

25. A device according to claim 23, wherein the substantially point-shaped light sources are arranged in a two-dimensional array.

26. A device according to claim 22, wherein the illumination arrangement comprises an optical diffusor plate arranged to create a plurality of individual radiation sources when being illuminated.

27. A device according to claim 22, wherein the picture reproduction unit comprises a telecentric lens.

28. A device according to claim 22, wherein the picture reproduction unit comprises a band-pass filter, the band-pass filter being designed to filter around a wave length comprised in the radiation emitted by the illumination arrangement.

29. A device according to claim 28, wherein the band-pass filter interval comprises 640 nm.

30. A device according to claim 28, wherein the band-pass filter interval comprises 880 nm.

31. A device according to claim 28, wherein the lower limit of the band-pass filter interval is approximately 560 nm.

32. A device according to claim 28, wherein the lower limit of the band-pass filter interval is approximately 600 nm.

33. A device according to claim 28, wherein the lower limit of the band-pass filter interval is approximately 760 nm.

34. A device according to claim 28, wherein the lower limit of the band-pass filter interval is approximately 840 nm.

35. A device according to claim 22, wherein the picture reproduction unit comprises a CCD camera.

36. A device according to claim 22, wherein the device comprises a computer unit connected to the picture reproduction unit for automatically analysing the reproduced picture of the edge.

* * * * *